M. H. AVRAM.
BRICK PRESS.
APPLICATION FILED JULY 3, 1915.

1,202,644.

Patented Oct. 24, 1916.
8 SHEETS—SHEET 4.

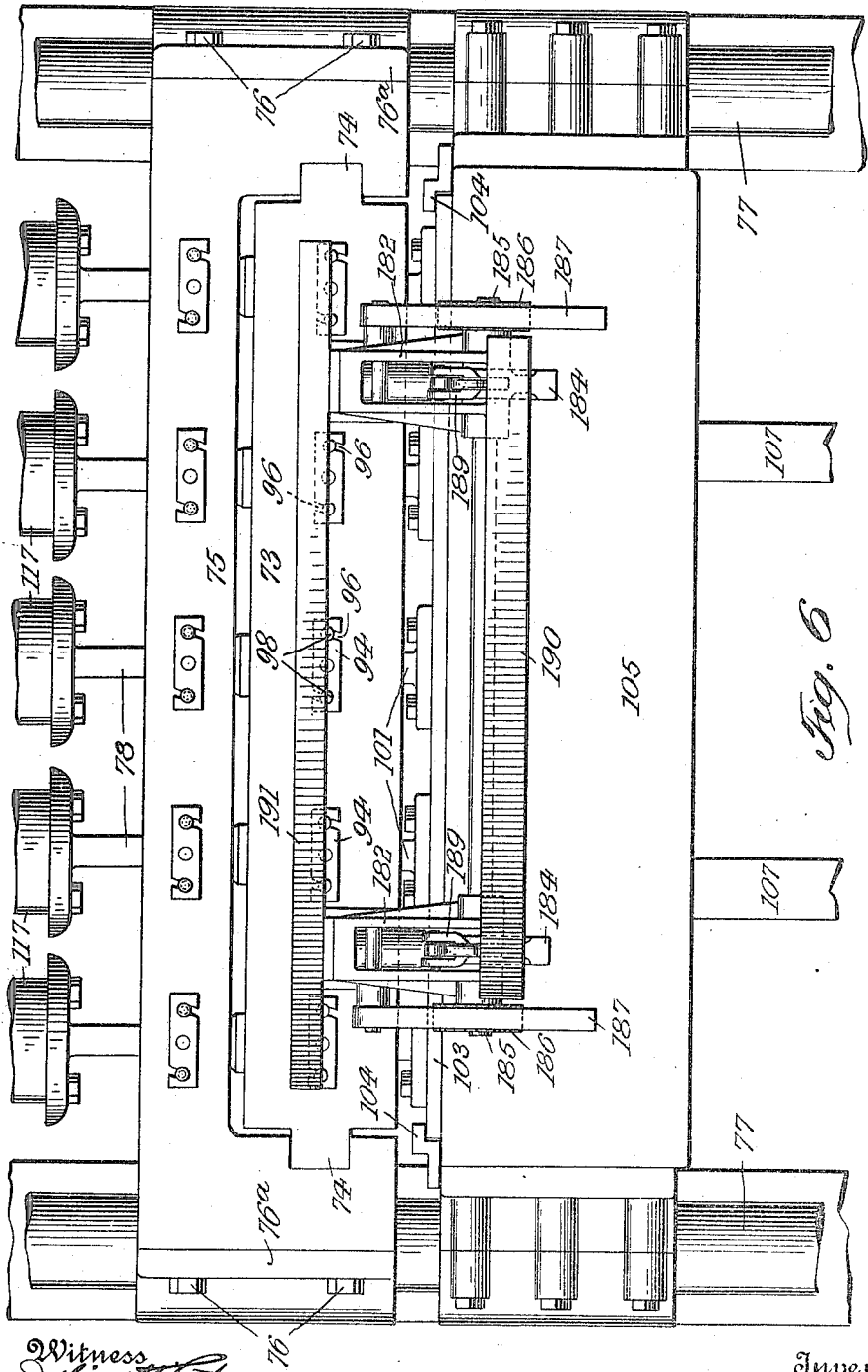

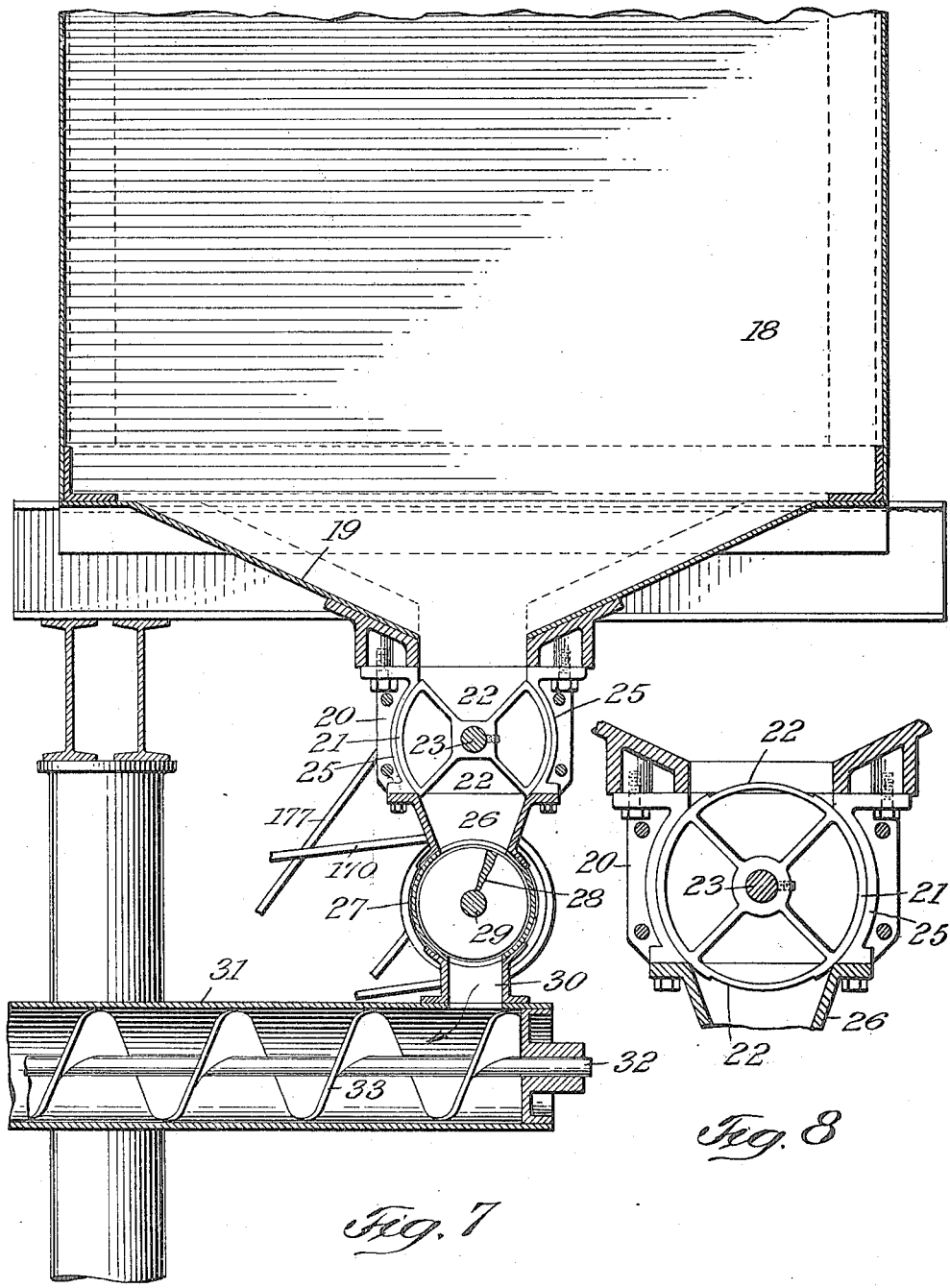

M. H. AVRAM.
BRICK PRESS.
APPLICATION FILED JULY 3, 1915.

1,202,644.

Patented Oct. 24, 1916.
8 SHEETS—SHEET 8.

Witness
Julius H. Cost

Inventor
Moïs H. Avram
By his Attorney
Arthur E. Zuempe

UNITED STATES PATENT OFFICE.

MOÏS H. AVRAM, OF NEW YORK, N. Y.

BRICK-PRESS.

1,202,644. Specification of Letters Patent. Patented Oct. 24, 1916.

Application filed July 3, 1915. Serial No. 37,800.

*To all whom it may concern:*

Be it known that I, Moïs H. Avram, a citizen of the United States, and a resident of New York city, county and State of New York, have invented certain new and useful Improvements in Brick-Presses, of which the following is a specification.

This invention relates to a novel machine or press for manufacturing sand lime bricks and more particularly for carrying out the method of making such bricks as described and claimed in the United States Letters Patent #1,102,851 granted to me July 7th, 1914.

The main feature of this method consists in separating from a previously prepared dry mixture of various ingredients, such partial quantities as are just sufficient for the production of single bricks. For practising this method my improved machine is provided with a suitable number of measuring or weighing devices, the number of which corresponds to that of the molds in which compression takes place. Each of these measuring devices separates automatically from the bulk of the thoroughly agitated dry mixture, a quantity which is just sufficient for making a single brick or block. After this separated quantity has been discharged from the measuring device, it is conveyed to a miniature mixer, in which moisture is added to the material, preferably in the form of hot water or steam. The plastic mass thus formed is then introduced into a suitable mold, in which it is pressed into the shape desired.

A further object of my invention is to effect a high compression of the material in a short time and to permit the escape of the inclosed air, so as to produce a dense brick of great mechanical resistance. If air is permitted to remain within the finished product the latter will show cracks running through the same, or even if cracks will not show, tests will readily prove the weakness of such blocks. In order to produce dense blocks of great resistability, I apply to the plastic mass a preliminary comparatively low mechanical pressure and a subsequent comparatively high hydraulic pressure, as will hereinafter be more fully described.

My invention also comprises other novel features of construction as more fully pointed out in the following specification and claims.

Figure 1:
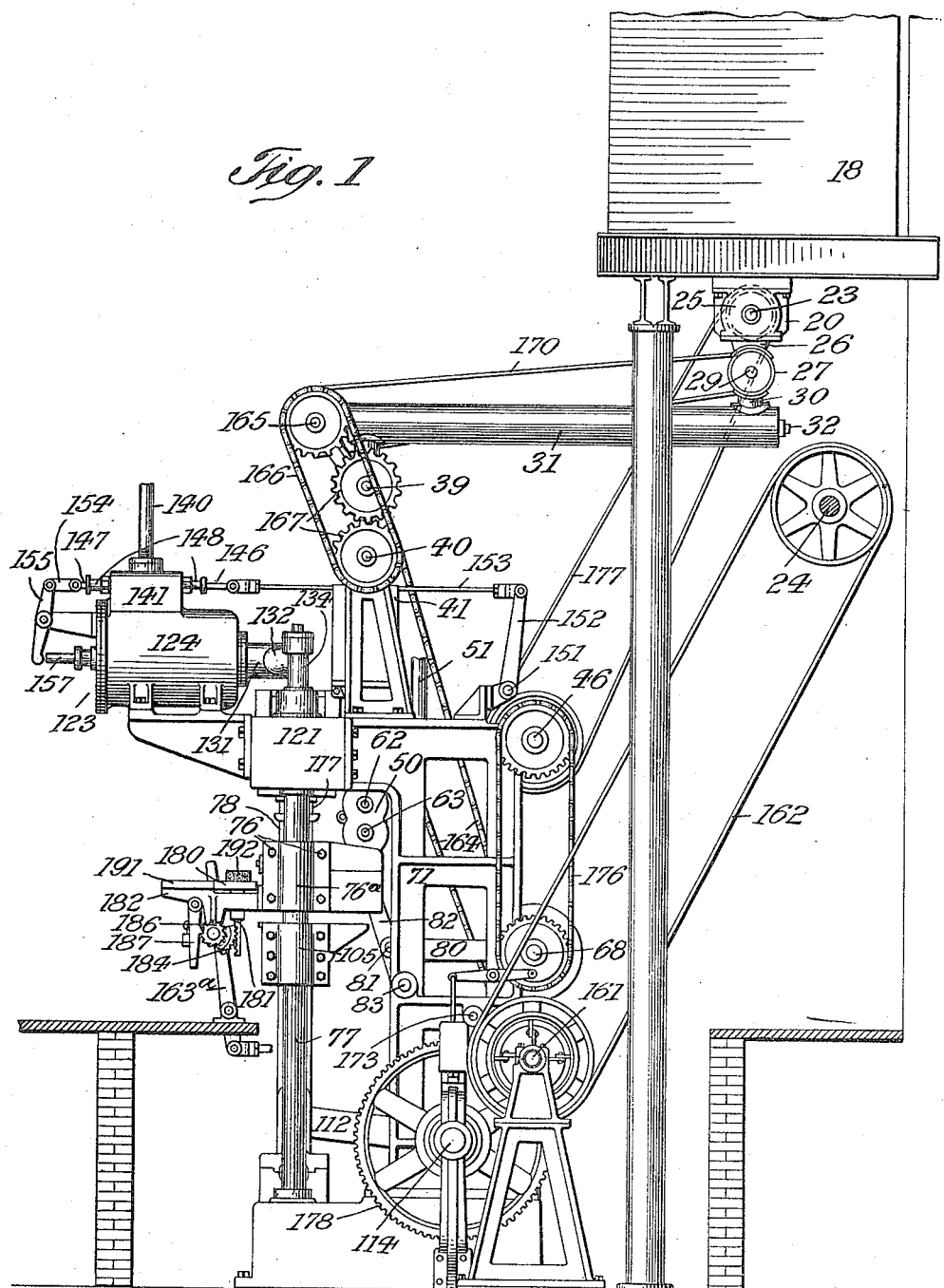
Figure 2:
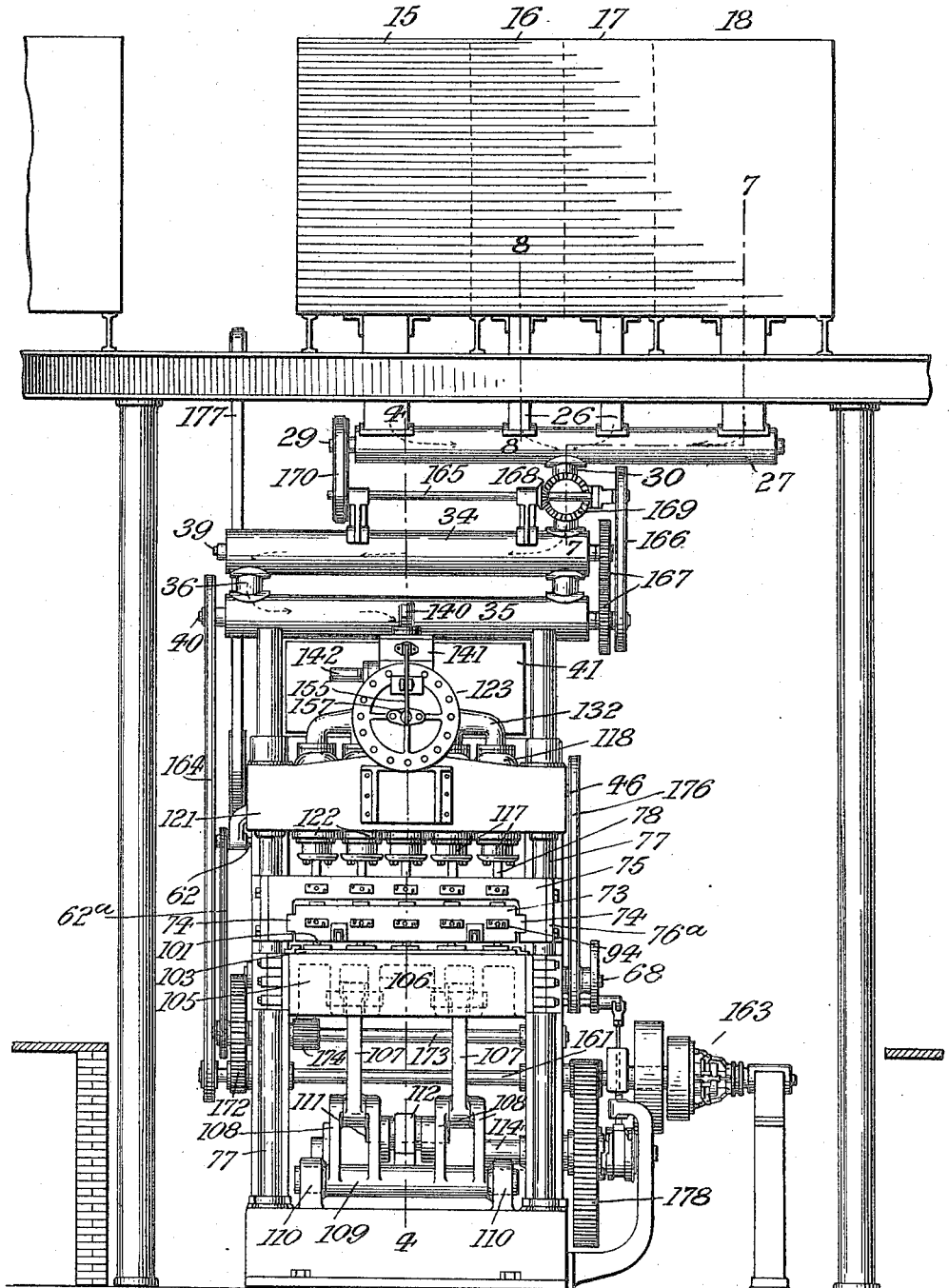
Figure 3:
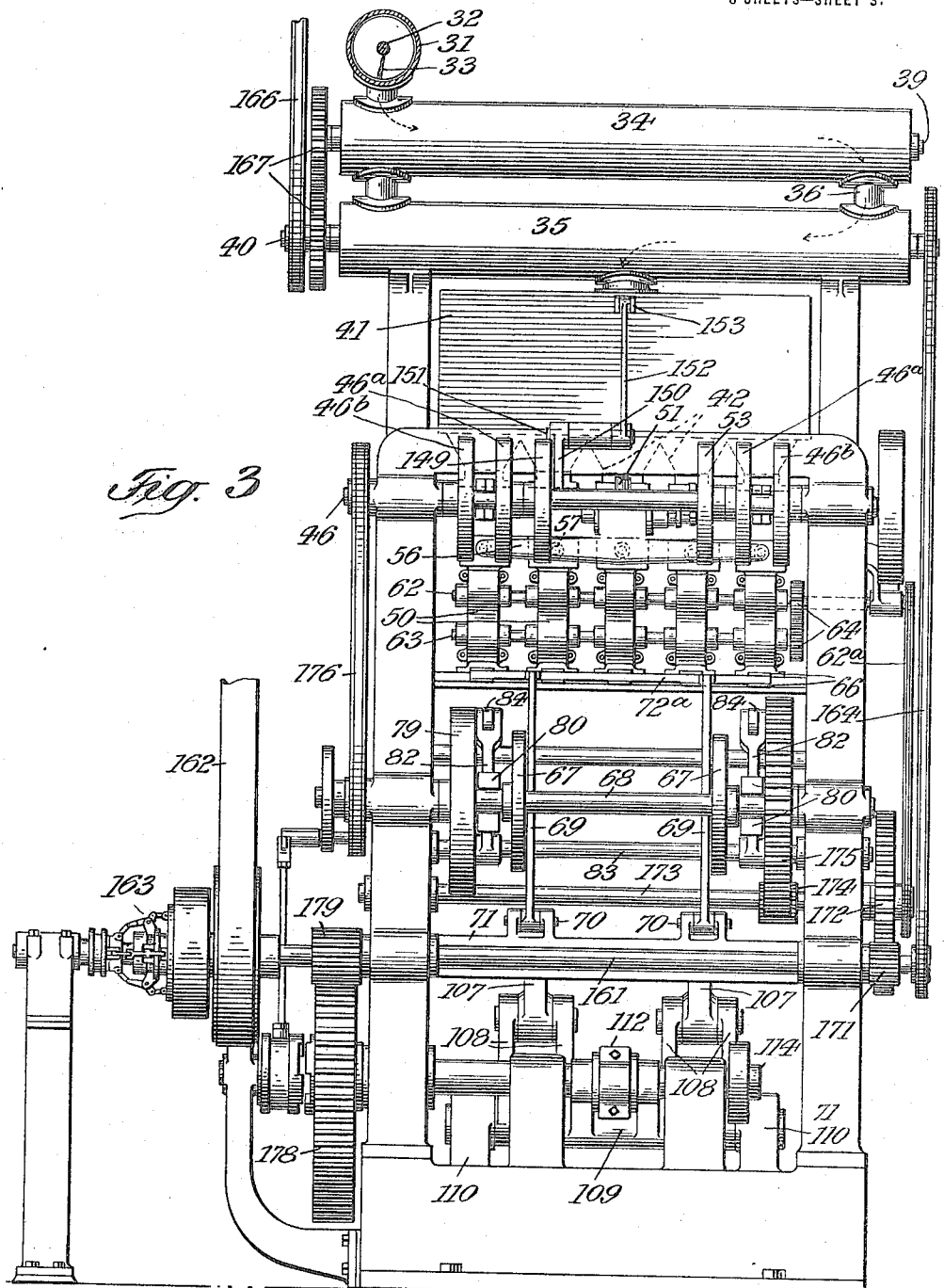
Figure 4:
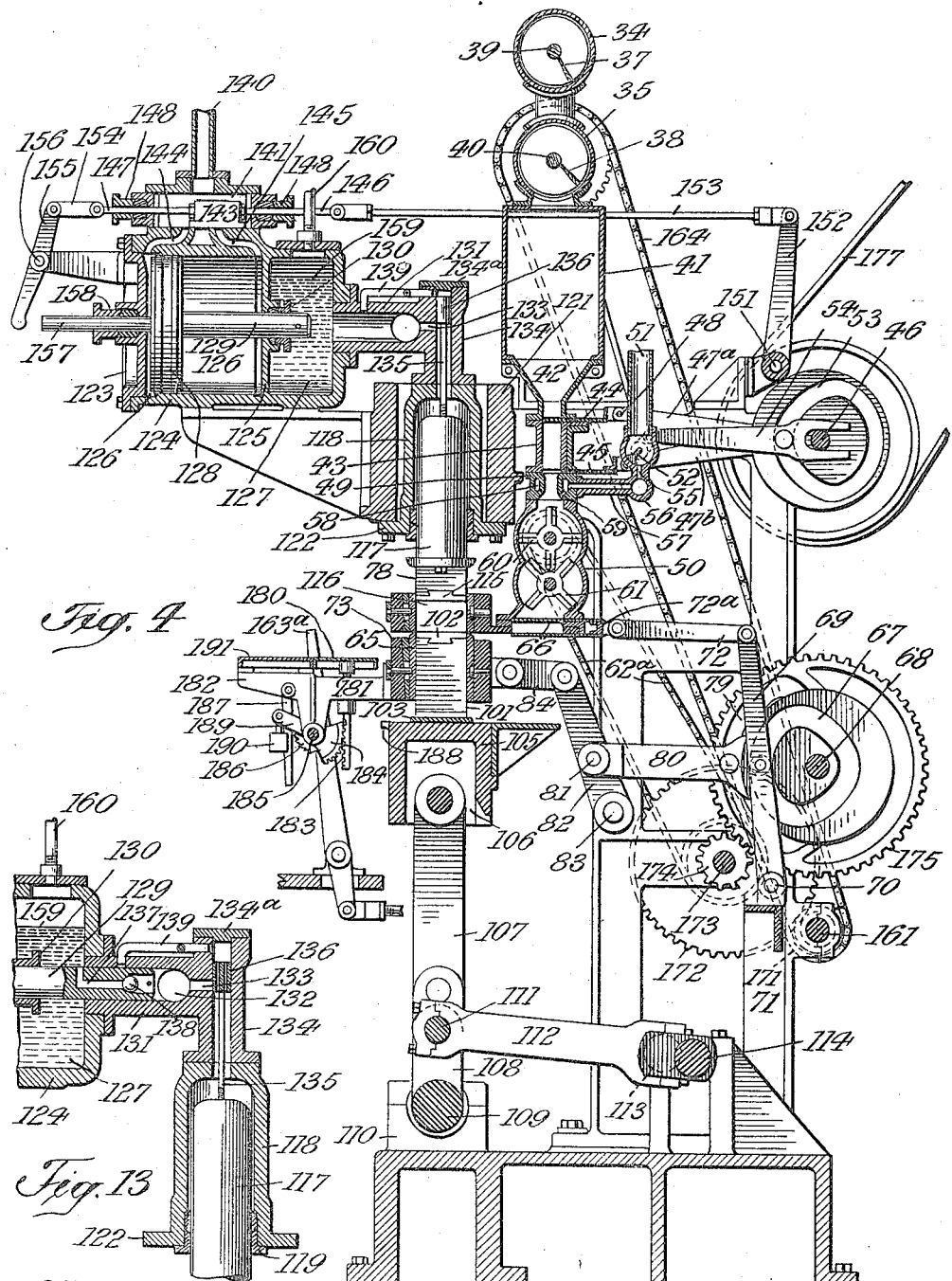
Figure 5:
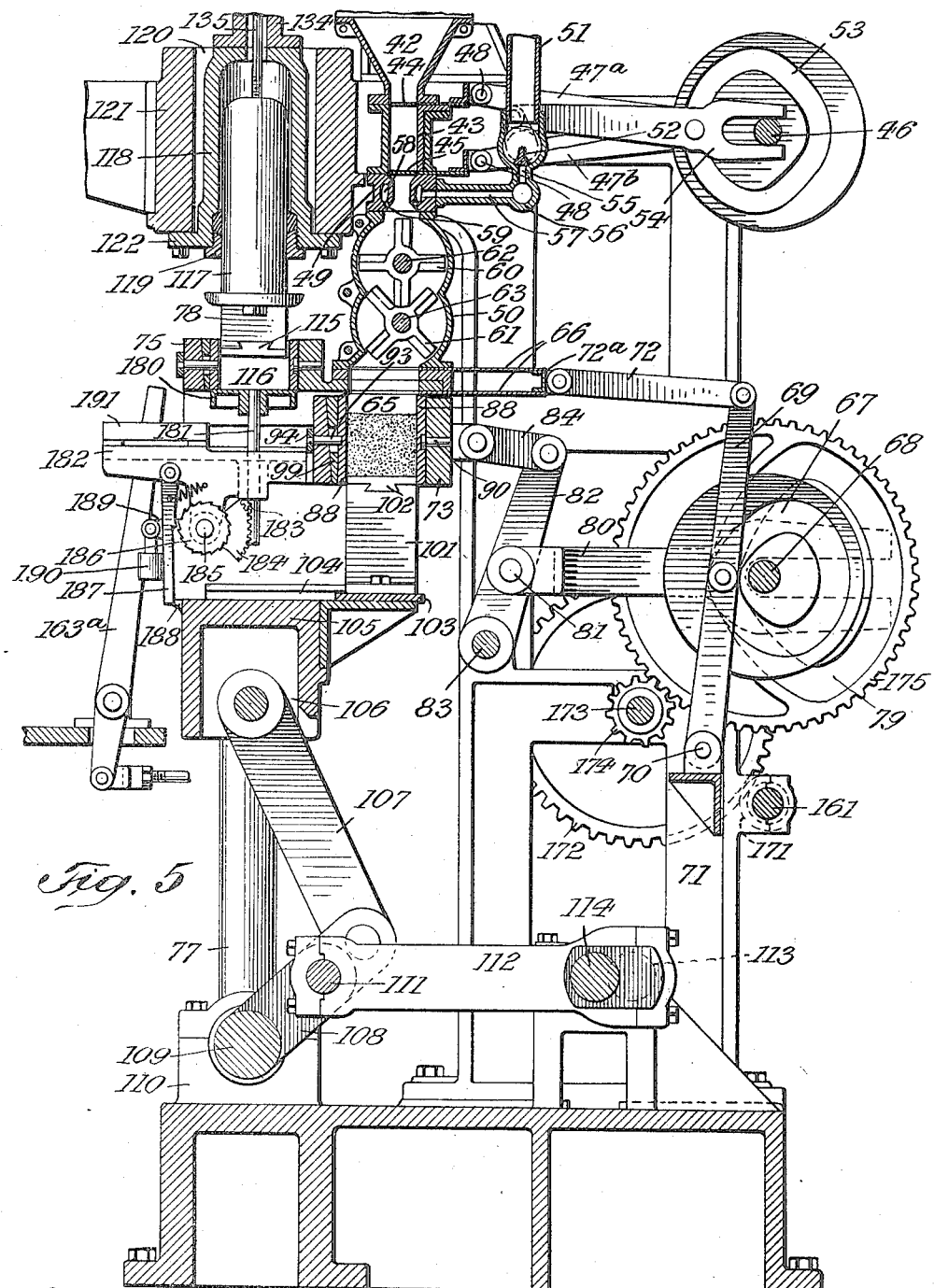
Figure 9:
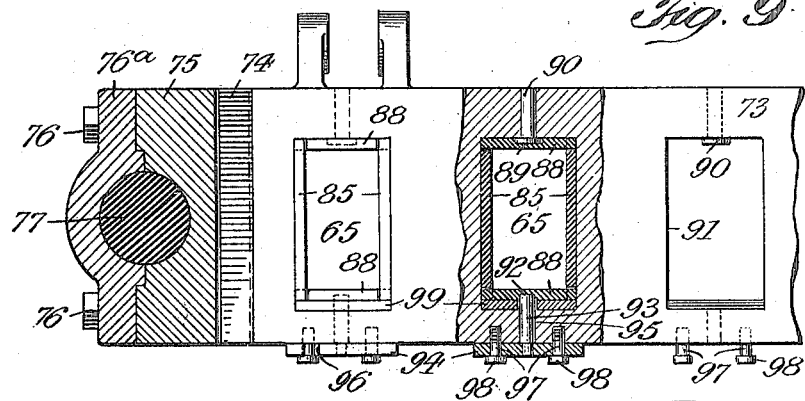
Figure 10:
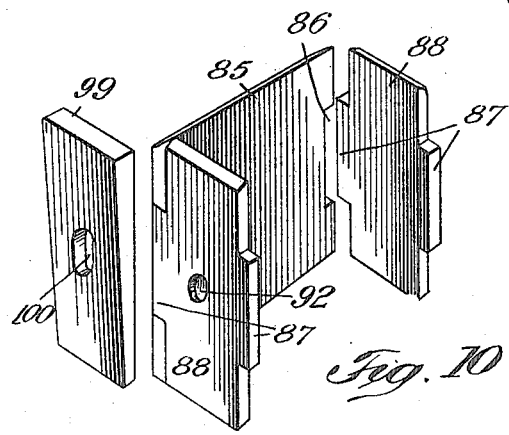
Figure 11:
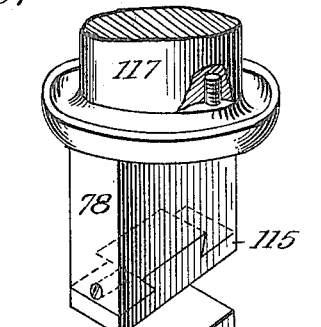
Figure 12:
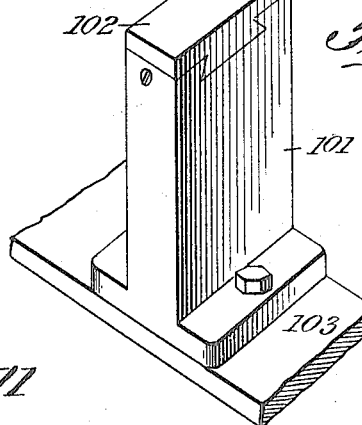

In the accompanying drawing, Figure 1 is a side elevation of a brick press embodying my invention; Fig. 2 a front elevation thereof; Fig. 3 a rear elevation; Fig. 4 an enlarged vertical section on line 4—4, Fig. 2; Fig. 5 a still more enlarged section, similar to Fig. 4, showing the parts in a different position; Fig. 6 an enlarged front view of the brick receiving table and coöperating parts; Fig. 7 an enlarged vertical section on line 7—7, Fig. 2; Fig. 8 a vertical section on line 8—8, Fig. 2; Fig. 9 a sectional plan of the mold frame; Fig. 10 a perspective view of portion of a mold showing the parts detached; Fig. 11 a perspective view of a locking plate; Fig. 12 a perspective view of a pair of coacting plungers, and Fig. 13 a detail section through part of the hydraulic compressing means.

My improved brick press comprises essentially a plurality of bins 15, 16, 17, 18 adapted to hold the dry ingredients that jointly go into the formation of the sand lime bricks. Of these, the larger bins 15, 18 contain sand and lime respectively while the smaller bins 16, 17 hold cement and a suitable coloring agent. Each of the above bins is provided at its bottom with a hopper 19 that opens into a measuring device 20, the capacities of the several devices 20 being so dimensioned as to simultaneously segregate from the bulk of the materials contained in the bins, such quantities as to insure the proper composition of the mixture from which the bricks are subsequently made. Each of the measuring devices 20 is shown to comprise a rotary drum 21 having a pair of diametrically opposed pockets 22, said drum being secured to a horizontal shaft 23 that receives rotary movement from a suitable power shaft 24 in manner hereinafter described. Drum 21 rotates within a substantially cylindrical casing 25 secured to hopper 19 and open at its top and bottom. At their lower ends, casings 25 communicate through conical chutes 26 with a horizontal conveying and mixing tube 27 containing a right and left feed screw 28 carried by a shaft 29 which screw is so pitched as to convey the dry mixture discharged from chutes 26 toward a central outlet duct 30. From the latter the material enters a conveyer tube 31 that extends forwardly from bins 15, 16, 17, 18. Upon a shaft 32 extending axially through tube 31, there is mounted a conveyer 33 that simultaneously mixes and advances the dry material toward a conveyer tube 34 arranged vertically above another similar tube 35, communicating with the tube 34 through branch 36, the conveyers 37, 38 of said tubes being mounted upon shafts 39, 40 respectively, the path of the material being indicated by arrows in Fig. 2.

From tube 35 the material is discharged into an oblong receptacle 41, provided along its bottom with a plurality of hoppers 42 the number of such hoppers corresponding to the number of molds comprised by the press, the drawing showing five of such molds. Each hopper 42 opens into the casing 43 of a measuring device, the capacity of each casing 43 being such as to hold the exact quantity of the dry mixture that goes into the formation of a single brick or stone. The measuring means proper consist of a pair of spaced slides 44, 45 that are adapted to be alternately advanced into and withdrawn from casing 43. Slides 44, 45 are operated from a cam shaft 46 through suitable cam disks 46$^a$ 46$^b$ and links 47$^a$, 47$^b$ pivoted to said slides as at 48, the construction and operation of the slides not forming part of the present invention. It may only shortly be stated that upon an advance of the lower slide 45 and a withdrawal of the upper slide 44 the material will drop from hopper 42 into casing 43. The advance of the upper slide into casing 43 will segregate from the bulk of the dry mixture just sufficient material for making a single brick. Upon the subsequent withdrawal of slide 45, the segregated material passes through socket 49 into a miniature wet mixer 50. While descending through socket 49, moisture is applied to the mass preferably in the form of steam. The admission of the proper quantity of steam supplied through pipe 51 is controlled by a valve 52 operated from a grooved cam 53 of shaft 46 through a forked link 54. The outlet 55 controlled by the valve 52 opens into a transverse pipe 56 the branches 57 of which communicate with annular ducts 58 of the socket 49 that in turn communicate with the interior of the sockets through discharge orifices 59.

Each miniature wet mixer 50 is shown to comprise a pair of coöperating mixing spiders 60, 61, the spiders 60 of all of the mixers being mounted on a common shaft 62 while the spiders 61 are carried by a common shaft 63. The latter is by gear wheels 64 connected to the shaft 62 that receives rotary movement in manner hereinafter described. From the mixers 50, the plastic material is intermittently discharged into the preliminary molds 65 through a reciprocative double gate 66. All of the gates 66 are operated from the cams 67 of a shaft 68 by means of cam levers 69 pivoted at 70 to the machine frame 71, the levers 69 being connected to the gates by means of links 72 and a connecting cross bar 72$^a$.

The molds 65 are made detachable so as to permit a ready exchange and adjustment thereof in case of wear, etc., all of the molds forming part of a common slide 73. The latter is provided with a pair of tongues 74 slidably engaging corresponding guide ways of a traverse 75 firmly attached by clamp plates 76$^a$ and screws 76 to a pair of upright cylindrical posts 77 constituting part of the machine frame 71. The means for intermittently reciprocating slide 73 so as to bring the molds 65 either beneath mixers 50 or beneath a hydraulic ram 78 hereinafter more fully referred to, comprise a pair of cams 79 fast on the shaft 68 and engaged by the corresponding rollers of forked arms 80. The latter are at 81 pivoted to levers 82 that turn loosely on a shaft 83 and are connected to the slide 73 by links 84.

Each mold 65 is shown to comprise a pair of side plates 85 notched as at 86 for the reception of corresponding tongues 87 of end plates 88. In order to securely hold plates 85, 88 to slide 73, one of the end plates 88 is recessed at its outer face as at 89 adapted for the reception of the end of a headed bolt 90 carried by slide 73 and protruding into the mold-receiving opening 91 of said slide. The other end plate 88 is recessed as at 92 for the reception of the free end of a bolt 93 fast on a locking plate 94 and loosely received within a corresponding bore 95 of slide 73. Plate 94 is slotted as at 96 adapted to engage a pair of screws 97 tapped into the slide, the heads 98 of said screws, when tied up, preventing an accidental withdrawal of bolt 93 from the slide. The parts 85, 88 are firmly clamped together by means of a wedge 99 engaging one of the end plates 88 and provided with an elongated aperture 100 for the accommodation of bolt 93.

Each of the molds 65 is permanently engaged by a mechanically operated plunger 101 provided preferably at its top with an exchangeable hardened pressure plate 102. At their bottoms all of the plungers 101 are secured to a transversely extending horizontally movable slide 103 guided in suitable rails 104 of a piston 105 loosely mounted on posts 77. For imparting a vertically reciprocating movement to piston 105, the latter is provided with a pair of bearings 106 to which the upper ends of links 107 are fulcrumed. At its lower end, each link 107 is pivotally connected to a pair of arms 108 made integral with a shaft 109 journaled in fixed bearings 110. The two opposed inner arms 108 are connected by a pintle 111 engaged by one end of a connecting rod 112 the other end of which engages the crank 113 of a shaft 114. As thus far described it will be seen that during the rotation of shaft 114, the toggles 107, 108 will be alternately straightened and bent in thereby alternately raising and lowering piston 105 together with plungers 101. The several parts are so dimensioned that even in the lowermost position of the piston 105, the plungers 101 are not entirely withdrawn from the molds 65 (Fig. 5), so that these plungers and their supporting slide 103 will participate in the horizontally reciprocative movement of slide 73 and molds 65. After the piston 105 and the slides 73, 103 have arrived in the position illustrated in Fig. 5, gates 66 are withdrawn to permit the plastic material to be discharged from the miniature mixers 50 into the molds 65. After each of the latter has thus been charged with a quantity of wet material just sufficient to form a single brick, slide 73 is advanced until the molds have arrived vertically below the hydraulic rams 78 hereinabove referred to.

Rams 78 correspond in cross section exactly to plungers 101 and are provided at their bottom with hardened pressure plates 115, said rams playing within the final molds 116 that form part of traverse 75. The molds 116 are made detachable so as to permit a ready exchange and adjustment thereof and constitute in all respects excepting their reduced height, true duplicates of molds 65 so that a detailed description thereof appears superfluous. Rams 78 are firmly attached to hydraulic plungers 117 that are accommodated within cylinders 118 provided with lower packings 119. Cylinders 118 are mounted within corresponding openings 120 of a traverse 121 firmly secured to the posts 77. At their lower ends cylinders 118 are provided with flanges 122 secured to traverse 121 in suitable manner and preventing any upward movement of the cylinders during the introduction of the pressure medium. The latter is simultaneously applied to all cylinders 118 from a hydraulic compressor 123 comprising a cylinder 124 provided with a centrally apertured transverse partition 125 that divides the interior of said cylinder into two compartments or chambers 126, 127. Within chamber 126 is contained a piston 128 having a piston rod or plunger 129 that passes through a suitable stuffing box 130 of partition 125 into the chamber 127 containing oil or another fluid. In axial alinement with plunger 129 the outer wall of the chamber 127 is provided with an auxiliary cylinder 131 adapted to snugly receive said plunger. Cylinder 131 communicates with a manifold 132 the branches of which open in turn through ducts 133 into the cylindrical extensions 134 that are firmly attached to cylinders 118 and communicate with the interior thereof, said extensions being closed at the top by covers 134a. To the upper end of each plunger 117 is secured a rod 135 that passes loosely through the extension 134 and carries at its top a longitudinally perforated slide valve 136.

The plunger 129 is provided with an angular duct 137 for establishing communication between the oil chamber 127 and the interior of manifold 132 during the return stroke of the plunger, a suitable back pressure valve 138 preventing an escape of the oil entrapped within cylinder 131 into said oil chamber during the compression stroke of the plunger. Cylinder 131 communicates furthermore through suitable ducts 139 with the several extensions 134 above slide valves 136 as clearly illustrated in Fig. 13.

Piston 128 is actuated by means of a suitable pressure medium such as steam admitted through an inlet pipe 140 into a valve chest 141, while the spent medium escapes through an outlet pipe 142. Within chest 141 is arranged a slide valve 143 controlling ducts 144, 145 and provided with rods 146, 147 that pass outward through suitable stuffing boxes 148 of said chest. The slide valve 143 is actuated from a suitable cam 149 of shaft 46 through a cam lever 150 fast on a shaft 151. To the latter is in turn firmly attached a lever 152 which is connected to rod 146 by means of an adjustable link 153. Rod 147 is, by link 154, connected to one arm of a two-arm lever 155 pivoted at 156, the other arm of which is adapted to be engaged by a piston rod 157 of piston 128 for a purpose hereinafter more fully described, rod 157 passing outward from piston 128 through a suitable stuffing box 158 of cylinder 123.

Chamber 127 is partly filled with a suitable liquid, such as oil, to about a level 159 as indicated in Fig. 4. This liquid which of course also fills cylinder 131, manifold 132 and the several cylinders 118 is permanently placed under a certain air pressure for which purpose a suitable compressed air supply pipe 160 opens into chamber 127, which pipe is connected to convenient means (not shown) for supplying air under pressure.

The parts hitherto described receive motion in the following manner: From the power shaft 24 rotary motion is transmitted to a counter shaft 161 by means of a belt 162 and a clutch 163 that is operable through hand lever 163a. Shaft 161 drives, by means of a chain 164, the shaft 40 which in turn transmits motion to a shaft 165 by means of a chain 166 while the shaft 40 is also intergeared with the shaft 39 through gear wheels 167. Upon shaft 165 is firmly mounted a beveled gear wheel 168 meshing into a similar wheel 169 fast on the conveyer shaft 32 while, through an additional belt 170 motion is transmitted from shaft 165 to the conveyer shaft 29. For driving the cam shafts 68, 46 and the shaft 23 that operates the measuring devices 20, countershaft 161 is provided with a relatively fixed pinion 171 meshing into a gear wheel 172 fast on a shaft 173. To the latter is secured a pinion 174 engaging a gear wheel 175 made integral with one of the cams 79, cam shaft 68 in turn, transmitting motion to the cam shaft 46 by means of a chain 176. Shaft 46 finally is operatively connected to shaft 23 through belt 177 while shaft 173 is connected to the mixer shaft 62 through chain 62ª. For operating the toggle levers 107, 108 shaft 114 is provided with a relatively fixed gear wheel 178 meshing into a pinion 179 fast on shaft 161.

As thus far described the operation will be as follows: The several measuring devices deliver intermittently and in predetermined quantities, the various ingredients that go into the manufacture of the sand lime bricks from their respective storage bins 15, 16, 17, 18 into the common conveying and mixing tube 27. From the latter, the dry material is discharged into the conveyer tube 31 from which it is consecutively fed through tubes 34, 35 into the receptacle 41. Owing to the repeated change in the direction of travel of the dry ingredients while following the sinuous course above indicated, the material arrives in a thoroughly and intimately intermixed condition within receptacle 41. Through the hoppers 12 this still dry mixture enters the measuring casings 46, the slides 44, 45 of which separate from said mixture just such individual quantities as are required for forming single bricks or stones. Each of the quantities thus segregated drops from casing 46 into a miniature wet mixer 50, it being provided with the necessary moisture through discharge orifices 59 while passing from said casing into the miniature mixer. While the preparation of the wet plastic mass thus takes place within the mixers 50, the slide 73 together with the molds 65 is brought into the position shown in Fig. 5, the plungers 101 occupying their lowermost position. After the parts have thus been brought into the proper position, gates 66 are withdrawn to permit the spiders 61 to discharge the properly mixed wet material into the molds 65, said material being supported upon plungers 101. After the molds 65 have been properly charged, gates 66 are closed and slide 73 is advanced until said molds have arrived in axial alinement with the rams 78, in which position the slide 73 will remain stationary for a certain length of time owing to the relatively long circular portion 67ª of cam groove 67 (Fig. 5). When the molds 65 arrive below the rams 78 the latter occupy (for reasons hereinafter more fully described) their lowermost position, the lower faces of pressure plates 115 being flush with the lower faces of molds 116. After the parts have arrived in the positions described, the toggles 107, 108 become gradually straightened out, thereby raising the piston 105 together with the plungers 101. In this way, the plastic material previously contained within each mold 65 is transferred into the superposed mold 116. This transfer however, takes place against the weight of ram 78 and plunger 117 and against the air pressure exercised upon the liquid contained within chamber 127, said air pressure being transmitted to the plunger through said liquid. This pressure is so calculated that during the straightening of the toggles 107, 108, a relatively high preliminary compression takes place, during which compression the ram 78 and plunger 117 is raised into the position shown in Fig. 4.

After the preliminary compression has been completed, slide valve 143 is shifted toward the right (Fig. 4) by means of cam 149 and the several connecting parts so that the pressure medium such as steam, will enter compartment 126 at the left side of piston 128 thereby forcing the latter toward the right. In this way, the plunger 129 will enter the cylinder 131 and exercise a high pressure upon the liquid thus entrapped within said cylinder, manifold 132, extensions 134 and cylinders 118. From Fig. 4 it will be readily observed that the area of cylinder 128 considerably exceeds that of cylinder 131 so that the plunger 129 is advanced with a considerable force against the entrapped fluid body. As the latter is non-compressible, the liquid forced out of cylinder 131 causes a corresponding downward movement of the pistons 117 and rams 78 to finally compress the masses contained within the molds 116. The operation of slide valve 143 is so timed that the descent of rams 78 takes place while the toggles 107, 108 are straightened (Fig. 4) in which position they offer an unyielding resistance to the compressing action of the hydraulic rams. It will be seen that during the downward movement of pistons 117 the likewise descending slide valves 136 will gradually close the ducts 133 until finally the communication between the cylinder 131 and the ram cylinders 118 is interrupted when the final compression of the manufactured blocks is completed. At substantially this moment, the return movement of the slide 73 commences while the pistons 101 are simultaneously withdrawn therefrom until these parts occupy the position illustrated in Fig. 5, the molds 65, being thus ready to receive fresh charges of plastic material. As by the closing of ducts 133 through the slide valves 136, the oil contained within cylinders 118 is relieved of pressure the compressed bricks will, by frictional contact, remain within their respective final molds 116 although the plungers 101 have been withdrawn therefrom. Simultaneously with the commencement of the return movement of slide 73, slide valve 143 is shifted toward the left (Fig. 4) so that the plunger 129 is gradually withdrawn from cylinder 131, which withdrawal is rendered possible owing to the provision of the back pressure valve 138. During the last portion of the return stroke of the piston 128, the piston rod 157 encounters lever 155, thereby moving the slide valve 143 toward the right and admitting a certain amount of steam to the left side of piston 128, said steam acting as a cushion to prevent heavy shocks from being imparted to the machine. As soon as the plunger 129 has cleared the cylinder 131, the air pressure resting upon the surface of the oil contained within chamber 127 will cause said oil to flow through ducts 139 and perforated slide valves 136 into the extensions 134. In this way the several plungers 117 will be forced downward to eject the compressed bricks from their molds 116 which bricks are delivered upon a vertically reciprocative receiving table 180 the construction and operation of which will now be described.

The table 180 is supported by rods 181 that are guided in corresponding bearings of a pair of brackets 182 extending forwardly from the slide 73. The lower protruding ends of rods 181 are toothed as at 183 for the engagement with toothed sectors 184 that are firmly attached to a common shaft 185 journaled in brackets 182. To the outer ends of shaft 185 are secured ratchet wheels 186 which are adapted to be engaged by spring-influenced detent levers 187. The latter are fulcrumed to the brackets 182 and are adapted to engage with their lower ends the abutments 188 of piston 105. The sectors 184 are provided with forwardly extending forked arms 189 which carry a common counterweight 190. In front of the vertically reciprocative table 180 there is supported by brackets 182 a portable table 191 that receives the compressed bricks from table 180 for final removal.

Whenever the bricks 192 are ready to be discharged from the molds 116 the parts occupy the position illustrated in Fig. 5. The bricks upon being gradually forced out of the molds cause a corresponding descent of table 180, the detent levers 187 being out of engagement with rods 181. After the bricks have been received by table 180 the latter will, by gravity, remain in its lowermost position, whereupon the slide 73 together with the brick-supporting tables is moved outward into the position illustrated in Fig. 1. The bricks are then shifted upon the table 191 so that the counterweight 190 is free to return the table 180 to its elevated position, in which position said table will be maintained owing to the engagement of the detent levers 187 with ratchet wheels 186. Immediately before the slide 73 arrives at its innermost position, the levers 187 engage abutments 188 to liberate the ratchet wheels 186 so that the device is ready to receive the next set of compressed bricks. The bricks received by table 191 are finally conveyed into a steam-indurating chamber which does not form part of the present invention.

In the claims appended hereto, I have used the term "mechanically actuated plunger" by which I wish to be understood to mean plungers operated by mechanical elements, such as the toggles 107 and 108, as distinguished from a fluid pressure operation, such as the hydraulic and pneumatic operation of the upper plungers 117.

In using the term "elastic resistance" in the claims, as applied to the operation of the upper plungers 117 under the preliminary compression stroke of the lower plungers 101, and the term "elastic pressure" as applied to the operation of said upper plungers in ejecting the completed brick, I wish to be understood to mean an air and steam pressure applied directly to the surface of the fluid in chamber 127, as distinguished from the pressure applied to the top of the plungers 117 through the entrance of the plunger 129 into the cylinder 131, the former affording an elastic resistance, as distinguished from the substantially unyielding action of the fluid upon the top of the plunger 117, due to the pressure exerted by the plunger 129 in cylinder 131.

I claim:

1. A brick press, comprising a feed for the material, a mold, a plunger adapted preliminarily to compress the mold-charge, a second plunger adapted finally to compress said charge against said first plunger and with unyielding pressure, said second plunger operating to resist said preliminary compression action of said first plunger, and means for confining a body of gas, said gas acting to cause said second plunger to afford an elastic resistance to said first plunger during said preliminary compression.

2. A brick press, comprising a feed for the material, a mold, a mechanically actuated plunger adapted preliminarily to compress the mold-charge, a hydraulic plunger adapted finally to compress said charge, said plunger operating to resist said preliminary compression action of said mechanically actuated plunger, and means for confining a body of gas, said gas acting to cause said second plunger to afford an elastic resistance to said first plunger during said preliminary compression.

3. A brick press, comprising a feed for the material, a mold, a plunger adapted preliminarily to compress the mold-charge, a second plunger adapted finally to compress said charge against said first plunger and with unyielding pressure, said second plunger operating to resist said preliminary compression action of said first plunger, and means for confining a body of gas, said gas acting to cause said second plunger to afford an elastic resistance to said first plunger during said preliminary compression and to apply elastic pressure to said second plunger to eject the completed brick from the mold.

4. A brick press, comprising a feed for the material, a stationary final mold, a movable preliminary mold adapted alternately to be brought into vertical alinement with the feed and with the final mold, a mechanically actuated plunger permanently engaging the preliminary mold and adapted preliminarily to compress the mold-charge and simultaneously convey said charge into the final mold, a hydraulic plunger engaging said final mold and adapted finally to compress said charge, means for relieving said hydraulic plunger of hydraulic pressure after the completion of the final compression of said charge, and means for applying elastic pressure to the hydraulic plunger for ejecting the completed brick from the final mold, the preliminary compression of the mold-charge and its conveyance from the preliminary mold into the final mold taking place while said elastic pressure is applied to the hydraulic plunger.

5. In a brick press, the combination with a horizontally reciprocal slide provided with a preliminary mold, of means for charging said mold with moldable material, a stationary final mold, the preliminary mold being adapted to be brought alternately into vertical alinement with the mold-charging means and with the final mold, a vertically reciprocal piston, a plate horizontally reciprocal on said piston, a first plunger carried by said plate and permanently engaging the preliminary mold, said plunger being adapted preliminarily to compress the mold-charge and simultaneously convey said charge into the final mold, a second plunger engaging the final mold, and means for operating said plungers.

6. A brick press, comprising a feed for the material, a mold, a plunger adapted to compress the mold-charge, a liquid on said plunger, means for causing said liquid to exert a hydraulic pressure on said plunger when desired, and means for exerting a gas pressure constantly on said liquid and through it on said plunger when said hydraulic pressure is not being exerted thereon.

7. A brick press, comprising a feed for the material, a mold, a plunger adapted to compress the mold-charge, a liquid on said plunger, means for causing said liquid to exert a hydraulic pressure on said plunger when desired, a valve movable with said plunger to cut off said hydraulic pressure, a by-pass through said valve to permit the passage of liquid therethrough when said hydraulic pressure is discontinued, and means for exerting a gas pressure constantly on said liquid and through it and said valve on said plunger when the hydraulic pressure is not being exerted thereon.

MOÏS H. AVRAM.

Copies of this patent may be obtained for five cents each, by addressing the "Commissioner of Patents, Washington, D. C."